United States Patent [19]

Gagnon

[11] 4,103,065
[45] Jul. 25, 1978

[54] COATED POLYCARBONATES AND ACRYLICS

[75] Inventor: Donald W. Gagnon, Sylvania, Ohio

[73] Assignee: Owens-Illinois, Inc., Toledo, Ohio

[21] Appl. No.: 713,730

[22] Filed: Aug. 12, 1976

[51] Int. Cl.$^2$ .................. B32B 27/42; C08L 43/04; C08L 83/04; B32B 27/16
[52] U.S. Cl. .................. 428/336; 260/824 R; 260/826; 260/827; 260/33.4 SB; 260/33.6 UA; 260/33.6 SB; 427/387; 428/334; 428/335; 428/412; 428/447; 428/451; 428/502; 428/522; 428/520; 428/339
[58] Field of Search .............. 428/412, 447, 335, 336, 428/339, 334, 520, 522, 451, 502; 427/387; 260/826, 827, 824 R, 33.4 SB, 33.6 UA, 33.6 SB

[56] References Cited

U.S. PATENT DOCUMENTS

| 3,468,836 | 9/1969 | Sekmakas | 428/412 |
|---|---|---|---|
| 3,644,566 | 2/1972 | Kincheloe | 428/412 |
| 3,668,272 | 6/1972 | Sekmakas | 428/412 |
| 3,707,397 | 12/1972 | Gagnon | 428/412 |
| 3,843,390 | 10/1974 | Hudson | 428/412 |
| 3,935,346 | 1/1976 | Stengle | 428/412 |
| 4,028,300 | 6/1977 | Wake | 428/451 |

OTHER PUBLICATIONS

"Silicone Resins for Coatings," *Union Carbide Bulletin* FA-3179, 11/70, pp. 1-5, 22-25.
"Hughson Coatings for Polycarbonate," *Hughson Chemicals Technical Bulletin* 7084, 1976.

*Primary Examiner*—Ellis Robinson
*Attorney, Agent, or Firm*—Charles S. Lynch; E. J. Holler

[57] ABSTRACT

Improved coatings on polycarbonate or acrylic articles are provided with the coating consisting essentially of the heat cured reaction product of the combination of a prescribed solvent-soluble further-curable organopolysiloxane, an alkylated melamine formaldehyde partial condensate resin and a prescribed composition which contains a linear diol, a thermosetting acrylic, a crosslinking agent, and an effective ultraviolet stabilizing amount of an ultraviolet stabilizer.

13 Claims, No Drawings

COATED POLYCARBONATES AND ACRYLICS

THE INVENTION

The present invention generally relates to improved coating compositions for polycarbonate or acrylic articles and, more particularly, relates to an improved polycarbonate or acrylic article having a thermoset heat-cured reaction product externally disposed as a surface layer on a polycarbonate or acrylic article. The surface layer has outstanding hardness, adhesion, abrasion resistance, mar resistance, chemical resistance, and acetone resistance and outstanding resistance to weathering.

The art is generally aware that coated polycarbonate or acrylic articles may be provided which have an externally disposed surface layer of the heat cured reaction product obtained by I. combining (a) a solvent-soluble, further-curable organopolysiloxane partial condensate product resin, said resin consisting essentially of the product obtained by the acid hydrolysis of a silane of the formula $CH_3Si(OR')_3$ and $C_6H_5Si(OR')_3$ in a mole ratio of the methyl silane to the phenyl silane of between about 1:10 to about 10:1 and wherein R' is an alkyl of 1–6 carbon atoms, (b) about 3 to about 15 parts by weight per 100 parts by weight of (a) an alkylated melamine formaldehyde partial condensate resin in an organic solvent solution, II. applying said organic solvent solution onto a polycarbonate or acrylic article, and III. evaporating said organic solvent and heat curing the residue to form said reaction product.

Generally the solvent-soluble further-curable organopolysiloxane partial condensate product resins are obtained by a process comprising heating a mixture consisting essentially of the above-indicated methyltrialkoxysilane, or a mixture of methyltrialkoxysilane and phenyltrialkoxysilane with water, wherein the molar ratio of water to silane is between about 1.5:1 to about 10:1, preferably between about 1.5:1 to about 5:1 in the presence of an effective catalytic amount of an acid hydrolysis catalysts, for example HCl, for about 1 to 10 hours at a temperature between ambient, more typically in excess of about 40° C. up to, and including, the reflux temperature for a period of about 1–10 hours so as to produce a substantially gel-free solution which contains a dissolved, hydrolyzed, and partially condensed organopolysiloxane and concentrating the solution containing said dissolved hydrolyzed and partially condensed organopolysiloxane by heating to remove some but not all volatile material, including alkanol by-product and some water, so as to obtain a solution of a solvent-soluble, hydrolyzed and further partially condensed organopolysiloxane. Typically concentration may be effected to produce a solids content of about 20 to about 75% by weight. The alkylated melamine formaldehyde partial condensate resin may be added to the solution produced by the concentrating step or, more suitably, the concentrated material will be precured by heating below the gel point thereof to provide a solvent-soluble further-curable organopolysiloxane and the precured solvent-soluble further-curable organopolysiloxane will be solidified, dissolved in an organic solvent to produce a solution and the alkylated melamine formaldehyde partial condensate resin then combined to the organic solvent solution. For further particulars with regard to the manner of manufacturing the organopolysiloxane reference may be had, for example, to U.S. Pat. Nos. 3,389,114, 3,389,121, 3,634,321, 3,383,773. An especially suitably employed organopolysiloxane will be a flake material generally produced in accordance with the teachings of U.S. Pat. No. 3,414,540. The above patents are all hereby incorporated by reference.

With regard to forming coatings on polycarbonate or acrylic surfaces with an organopolysiloxane as contemplated herein reference may be had to U.S. Pat. No. 3,451,838. Particularly suitable organopolysiloxanes which will be employed herein are commercially available materials supplied by Owens-Illinois, Inc. as their Type 650 or Type 100 organopolysiloxane with the former being especially preferred.

The alkylated melamine formaldehyde partial condensate resins are per se not new and are widely commercially available. In this respect reference may be had to U.S. Pat. No. 3,935,346, which is hereby incorporated by reference, which patent discloses compositions and methods for coating polycarbonates, polycarbonate articles and acrylics with a coating composition consisting essentially of two components, namely, an organopolysiloxane and an alkylated melamine formaldehyde partial condensate resin. Suitable commercially available resins of this type is a resin available from the Koppers Company under their designation B500–15 and that available from Rohm & Hoss under their designation MM-83. These resins are alkylated melamine formaldehyde partial condensate resins wherein alkylation has been effected with methanol and isobutanol in a mole ratio of methanol to isobutanol of at least about 1:1.

The coated polycarbonates, or acrylic articles, as produced from the above general prior art have many fine characteristics; however, it has now been found that their extremely long term weatherability is not satisfactory. Accordingly, applicant has solved this problem and satisfied a need in the art by providing for a polycarbonate, or acrylic article, which has long term weatherability and which is hard, acetone resistant, solvent resistant, abrasion resistant, and which will exhibit excellent adhesion to a polycarbonate, or acrylic article. Essentially these problems are solved, and the need satisfied, and the polycarbonate, or acrylic article, improved by combining along with the organopolysiloxane, (a) above, and the alkylated melamine formaldehyde partial condensate resin, (b) above, in an organic solvent solution about 25 to about 400 parts by weight, preferably about 100 parts by weight, per 100 parts by weight of the organopolysiloxane, designated (a) above, of (c) a composition containing (1) from about 5 to about 62 percent by weight of a linear diol, (2) from about 8 to about 35 percent by weight of a thermosetting acrylic containing about 10 percent by weight of the acrylic or an unsaturated carboxylic acid, from about 4 to about 10 percent by weight of the acrylic of a hydroxyalkyl ester of an alpha, beta-unsaturated carboxylic acid, with the remainder comprising at least one alkyl ester of an alpha, beta-ethylenically unsaturated carboxylic acid and (3) from about 17 to about 87 percent by weight of a cross-linking agent. Additionally there will be combined an effective ultraviolet stabilizing amount of an ultraviolet stabilizer. While the ultraviolet stabilizer may be added as a separate ingredient an outstanding composition for use herein as constituent (c) is the material available from Mobay Chemical Company under their designation Mobay 397-A or that available from Hughson Chemicals under their designation J-797. Preferably, the linear diol (1) of composition (c) will be a polycaprolactone polyester, the thermosetting acrylic (2) of composition (c) contains from about 50 to about 55% by weight of the acrylic of ethylacrylate, from 30 to about 34% by weight of the acrylic of methyl methacrylate, about 10% by weight of the acrylic of acrylic acid and from about 4 to about 10% by weight of the acrylic of 3-hydroxypropyl methacrylate. The crosslinking agent (3) of composition (c) will be an amine aldehyde reaction product. Hexamethoxymethylmelamine is a suitable crosslinking agent. Preferably composition (c) will also include an acid catalyst like the alkyl acid phosphates and sulfonic acids and derivatives thereof, e.g. para-tolunesulfonic acid. Conveniently the acid catalyst will be about 0.3 to about 10% by weight of solids of composition (c). Any suitable utraviolet stabilizer may be employed and it may be combined as a separate constituent or if the above-referred to commercially available material, i.e., Mobay's 397-A material, is employed an effective amount of such stabilizer is already present therein. Generally the stabilizer will be employed, either as a separate constituent or a constituent already present in (a), (b), or (c ), in an amount such that when the polycarbonate, or acyrylic surface, is coated with the present composition the ultraviolet stabilizer will be employed in such amount that at least 0.4 grams, and most preferably about 3 to about 30 grams, of the stabilizer will be present per square meter of treated surface of the polycarbonate, or acrylic article. Suitable utraviolet absorbers, or ultraviolet stabilizers, are the benzophenone derivatives, benzotrizole derivatives, derivatives of crotonic acid, substituted acrylates, and malonic acid esters, all of which are well known in the art. For further details with respect to constituent (c), and especially with regard to suitable ultraviolet stabilizers, reference may be had to U.S. Pat. No. 3,843,390 which is hereby incorporated by reference.

U.S. Pat. No. 3,843,390 essentially discloses the use of an ultraviolet stabilized composition designated (c) herein which can include a silicone or polysiloxane slip and/or flow agent as a coating for polycarbonates. Exemplary of such compositions is the commercially avialable 397-A material or J-797 material referred to above. It will be found that a coating with such a material has excellent long term weatherability but has other deficiencies, for example poor hardness which makes it unsuitable for use as a coating material for polycarbonates or acrylics.

The organic solvent employed to form the solvent solution as contemplated herein for application to the polycarbonate, or acrylic surface, will be routinely selected by those skilled in the art. Exemplary solvents are set forth in the above incorporated patents. Additionally when reference herein is made to parts this refers to weight parts and additionally is based on solid material. With regard to the solids concentration of the solution which is applied to the polycarbonate, or acrylic article, these concentrations will be routinely selected by those skilled in the art. In general, however, the composition applied will have a solids content of between about 15 to about 60%. Further, and as will be apparent to those skilled in the art, prior to the application of the present composition onto the polycarbonate, or acrylic, surface, the surface may be primed or flame treated, if desired. Exemplary of suitable primers are the thermosettable acrylic compositions for example set forth in U.S. Pat. No. 3,707,397 or the use of the known siloxane primers, for example gamma-aminopropyl triethoxysilane.

While the above sets forth the present invention with sufficient particularity to enable those skilled in the art to make and use same, nonetheless, there follows further exemplification of the present invention.

In the following, the solvent-soluble further-curable organopolysiloxane partial condensation product employed, as constituent (a), is a material, which when cured, forms a cured siloxane representable by the formula $CH_3SiO_{3/2}$; it was manufactured by the hydrolysis and condensation of a mixture consisting of methyltriethoxysilane, about 2-3 moles of water per mole of silane and effective catalytic amounts of hydrochloric acid as the hydrolysis catalysts. This material is available from Owens-Illinois, Inc. as their Type 650 organopolysiloxane flake material. Ingredient (b) of the present invention, i.e., the alkylated melamine formaldehyde partial condensate resin, was a methylated and isobutylated melamine formaldehyde partial condensate resin with the ratio of methyl groups to isobutyl groups being between about 2:1 to about 2.5:1. This material is commercially available from Koppers Company under their designation B500-15 Resin and is supplied as an 80 weight percent solution in isobutanol. Its color by Gardener (Delta) Max is about 1. It has a viscosity of 25° C. of $Z_2$-$Z_5$, a density of about 9.4 pounds per gallon and has a xylene tolerance of about 275 pounds per 100 pounds of the 80% solution. Ingredient (c) of the present invention was obtained commercially from Mobay Chemical Company under their designation 397-A. Additionally the latter material included an effective ultraviolet stabilizing amount of an ultraviolet stabilizer. The polycarbonate article which was coated was a polycarbonate about 4 ft. by 8 ft. by about ¼ inch and is commercially available under the designation Lexan.

EXAMPLE

The solvent-soluble further-curable organopolysiloxane partial condensation product resin was dissolved in a solvent of butyl alcohol and toluene (3 parts by weight the former to 1 part by weight of the latter) in order to obtain a solution containing 40% by weight of organopolysiloxane solids. To the above solution there was then added the Koppers 500-15 80% solution, such that the weight ratio of the alkylated melamine formaldehyde solids in the 500-15 solution to the ratio of the organopolysiloxane solids in the initially prepared solution was 10:100, this composition is designated composition (a+b). Another composition, designated composition (a+b+c) was prepared by combining, at room temperature, ingredient (c), (Mobay 397 which is a 40% by weight solution in a solvent which is an admixture of ethylene glycol dibutylether, butyl alcohol and toluene) to composition (a+b) such that the solids of the Mobay 397 material were about 100 parts by weight per 100 parts by weight of the organopolysiloxane solids; this composition was not prereacted at an elevated temperature and was applied as combined.

Respectively, and independently, composition (a+b), composition (a+b+c), and composition (c), notably the "as is" Mobay 397 material alone, were coated onto the polycarbonate article by a flow coating step. If desired, of course, dip coating and other conventional techniques could be employed. The solvents of the respective compositions were allowed to evaporate at room temperature and then the compositions were heated for a time and at a temperature sufficient to form a thermoset coating as the externally disposed surface layer on the polycarbonate articles. Table 1 below summarizes the characteristics of these coated polycarbonates.

TABLE I

|  | Composition (a+b) | Composition (c) | Composition (a+b+c) |
| --- | --- | --- | --- |
| Thickness | 0.3–0.5 mils | 1–1.5 mils | 1–1.5 mils |
| Hardness | 6H | 2H | 4H |
| Acetone Resistance | Excellent | Excellent | Excellent |
| Humidity Resistance[+] | Excellent | Fair to Good | Excellent |
| EMMAQUA | 120M–180M (Langley) | 900–933M (Langley) | 500M–600M (Langley) |
| 45° South | 1–2 mo. | 12+ mo. | 7 mo. |

[+]Determined by effect on adhesion of the coating to polycarbonate after being subjected to high humidity.

It will be observed that the composition of this invention, namely composition (a+b+c), has an excellent balance of properties, including satisfactory hardness, humidity resistance, and weatherability. In passing it should be mentioned that the weatherability of the coatings are indicated by the characteristics designated EMMAQUA and 45° South; both of these tests are well known weatherability tests and are preformed by the Desert Sunshine Test Station near Pheonix, Arizona. The equatorial mounted mirror with water test (EMMAQUA) produces a figure, designated in Langley units, and the higher the Langley unit the better the overall weatherability. Similarly the 45° South test is measured in months and the higher the number the better the weatherability.

Generally in order to achieve the outstanding coated polycarbonate, or acrylic articles, as contemplated herein the coating composition will be applied in such fashion as to obtain a coating thickness of between about 0.3 or 0.4 mils to about 1.7 or 1.8 mils with an ideal thickness being approximately ½–1 mil.

I claim:

1. In a coated polycarbonate or acrylic article having an externally disposed surface layer of a heat cured reaction product obtained by
   I. combining
   (a) a solvent-soluble, further-curable organopolysiloxane partial condensate product resin, said resin consisting essentially of the product obtained by the acid hydrolysis of a compound of the formula $CH_3Si(OR')_3$ or a mixture of compounds of the formula $CH_3Si(OR')_3$ and $C_6H_5Si(OR')_3$ in a mole ratio of the former to the latter of between about 1:10 to about 10:1 and wherein R' is an alkyl of 1–6 carbon atoms,
   (b) about 3 to about 15 parts by weight per 100 parts by weight of (a) an alkylated melamine formaldehyde partial condensate resin in an organic solvent solution,
   II. applying said organic solvent solution onto a polycarbonate, or acrylic article, and
   III. evaporating said organic solvent and heat curing the residue to form said reaction product, the improvement wherein said surface layer consists essentially of the heat cured reaction product obtained by combining said (a) and (b) constituents and about 25 to about 400 parts by weight per 100 parts by weight of (a) of
   (c) a composition containing (1) from about 5 to about 62 percent by weight of a linear diol, (2) from about 8 to about 35 percent by weight of a thermosetting acrylic containing about 10 percent by weight of the acrylic of an unsaturated carboxylic acid, from about 4 to about 10 percent by weight of the acrylic of a hydroxyalkyl ester of an alpha, beta-unsaturated carboxylic acid, with the remainder comprising at least one alkyl ester of an alpha, beta-ethylenically unsaturated carboxylic acid and (3) from about 17 to about 87 percent by weight of a crosslinking agent, and
   (d) an effective ultraviolet stabilizing amount of an ultraviolet stabilizer, said surface layer having a thickness of about 0.3 mils to about 1.8 mils.

2. The improvement of claim 1 wherein the thermosetting acrylic of (c) contains from about 50 to about 55 percent by weight of the acrylic of ethyl acrylate, from 30 to about 34 percent by weight of the acrylic of methyl methacrylate, about 10 percent by weight of the acrylic of acrylic acid and from about 4 to about 10 percent by weight of the acrylic of 3-hydroxypropyl methacrylate and wherein said article is a polycarbonate.

3. The improvement of claim 1 wherein the linear diol of (c) is a polycaprolactone polyester.

4. The improvement of claim 1 wherein said crosslinking agent of (c) is hexamethoxymethylmelamine.

5. The improvement of claim 1 wherein (a) is the hydrolysis product of $CH_3Si(O\text{-}C_2H_5)_3$ and wherein (b) is a resin wherein alkylation has been effected with methanol and isobutanol in a mole ratio of methanol to isobutanol of at least about 1:1.

6. The improvement of claim 1 wherein (a) and (b) and (c) are combined at about room temperature and applied without prereaction at an elevated temperature.

7. The improvement of claim 6 wherein about 100 parts by weight of (c) are employed relative to about 100 parts by weight of (a).

8. An organic solvent solution consisting essentially of
   (a) a solvent soluble, further-curable organopolysiloxane partial condensate product resin, said resin consisting essentially of the product obtained by the acid hydrolysis of a compound of the formula $CH_3Si(OR')_3$ or a mixture of compounds of the formula $CH_3Si(OR')_3$ and $C_6H_5Si(OR')_3$ in a mole ratio of the former to the latter of between about 1:10 to about 10:1 and wherein R' is an alkyl of 1–6 carbon atoms, and
   (b) about 3 to about 15 parts by weight per 100 parts by weight of (a) an alkylated melamine formaldehyde partial condensate resin in an organic solvent solution, and
   (c) about 25 to about 400 parts by weight per 100 parts by weight of (a) of a composition containing (1) from about 5 to about 62 percent by weight of a linear diol, (2) from about 8 to about 35 percent by weight of a thermosetting acrylic containing about 10 percent by weight of the acrylic of an unsaturated carboxylic acid, from about 4 to about 10 percent by weight of the acrylic of a hydroxyalkyl ester of an alpha, beta-unsaturated carboxylic acid, with the remainder comprising at least one alkyl ester of an alpha, beta-ethylenically unsaturated carboxylic acid and (3) from about 17 to about 87 percent by weight of a crosslinking agent, and
   (d) an effective ultraviolet stabilizing amount of an ultraviolet stabilizer.

9. The organic solvent solution of claim 8 wherein the thermosetting acrylic of (c) contains from about 50 to about 55 percent by weight of the acrylic of ethyl acrylate, from 30 to about 34 percent by weight of the acrylic of methyl methacrylate, about 10 percent by weight of the acrylic of acrylic acid and from about 4 to about 10 percent by weight of the acrylic of 3-hydroxypropyl methacrylate.

10. The organic solvent solution of claim 8 wherein the linear diol of (c) is a polycaprolactone polyester.

11. The organic solvent solution of claim 8 wherein said crosslinking agent of (c) is hexamethoxymethylmelamine.

12. The method which comprises applying the organic solvent solution composition of claim 8 to a polycarbonate or acrylic article without prereacting said composition.

13. The improvement of claim 1 wherein said stabilizer is present in composition (c) prior to said combining.

* * * * *